United States Patent [19]

Satou

[11] Patent Number: 4,849,823
[45] Date of Patent: Jul. 18, 1989

[54] FACSIMILE APPARATUS

[75] Inventor: Kouichirou Satou, Hino, Japan

[73] Assignee: Kabushiki Kaisha Toshiba, Kawasaki, Japan

[21] Appl. No.: 156,989

[22] Filed: Feb. 18, 1988

[30] Foreign Application Priority Data

Feb. 20, 1987 [JP] Japan .................... 62-35626

[51] Int. Cl.$^4$ .................... H04N 1/04; H04N 1/42
[52] U.S. Cl. .................... 358/474; 358/476; 358/494
[58] Field of Search ............... 358/256, 205, 285, 293, 358/292, 294, 300; 346/160

[56] References Cited

U.S. PATENT DOCUMENTS

| 4,277,805 | 7/1981 | Sato | 358/256 |
| 4,425,596 | 1/1984 | Satou | 361/93 |
| 4,584,612 | 4/1986 | Ono | 358/285 |
| 4,622,592 | 11/1986 | Ikehata et al. | 358/257 |
| 4,675,741 | 6/1987 | Shinohara | 358/256 |
| 4,720,750 | 1/1988 | Watanabe | 358/300 |

Primary Examiner—Edward L. Coles, Sr.
Assistant Examiner—Vu Kim Yen
Attorney, Agent, or Firm—Finnegan, Henderson, Farabow, Garrett & Dunner

[57] ABSTRACT

A facsimile apparatus for copying a document is described. The apparatus includes an optical system comprising a light source for illuminating a document and a fixed mirror and a lens for guiding the light from the light source reflected by the document. A line sensor converts the light-guided by the optical system into an electrical image signal. An electrostatic recording mechanism including a photosensitive body forms an image corresponding to the light entered onto the photosensitive body on a recording medium. A movable mirror selectively images the light guided by the fixed mirror and the lens onto one of the line sensor and the photosensitive body. A control system switches the position of the movable mirror such that the light guided by the fixed mirror and the lens is imaged onto the photosensitive body when the document is copied and is imaged onto the line sensor when the document is transmitted. In another embodiment, the light reflected by the document passes through the lens and is entered into the line sensor by a half mirror. The remaining light is entered onto the photosensitive body. According to the present invention, the image on the document is entered directly onto the photosensitive body, thereby improving the quality of the copied image.

14 Claims, 5 Drawing Sheets

FACSIMILE APPARATUS

BACKGROUND OF THE INVENTION

1. Field of the Invention

This invention relates to a facsimile apparatus which reproduces a read document image on a document using an electrostatic recording system of an image receiving unit.

2. Description of Prior Art

FIG. 6 shows a general structure of a facsimile apparatus using an electrostatic recording system. This apparatus includes transmitting unit 2 within an upper portion of housing 1 and receiving unit 3 within a lower portion of the housing.

In the transmitting unit 2, documents 5 on paper feed table 4 are separated sheet by sheet by feed roller 6 and frictional separating plate 7 and fed into housing 1. The thus fed document 5 is conveyed by conveyor rollers 8 and discharged by discharge rollers 9 to paper discharge table 10. Between conveyor rollers 8 and discharge rollers 9, document 5 is illuminated by fluorescent lamp 11 and the reflected light image is imaged onto a line sensor 14 via mirror 12 and lens 13. Line sensor 14 converts the image into an electrical signal which is then transmitted.

At receiving unit 3, sheets of recording paper 16 within cassette 15 are taken sheet by sheet by feed roller 17 and conveyed by converter rollers 18 and discharged by discharge rollers 19 to discharge paper table 20. The received image is converted to a laser beam which is then imaged onto photosensitive body 23 via polygon mirror 21 and mirror 22 to thereby be formed as an electrostatic latent image on body 23. This latent image is developed by developing unit 24 to thereby form a toner image onto photosensitive body 23. This toner image is then transferred to conveyed recording paper 16 by transfer corotron 25. The toner image transferred to the recording paper 16 is fixed to recording paper 16 by fixing rollers 26 provided before discharge rollers 19.

There are many facsimile devices of this type which are capable of reproducing an image in a document, read by a reading system of the transmitting unit thereof, using the recording mechanism of the receiving unit thereof. Namely, when a document is to be copied, transmitting unit 2 and receiving unit 3 are driven together to turn on and off a laser oscillator (not shown) in accordance with the image data read by line sensor 14. The laser beam from the laser oscillator is imaged onto photosensitive body 23 via polygon mirror 21 and mirror 22 to thereby reproduces the document image onto recording paper 16.

As just described above, when reproduction is performed by a facsimile device of this type, the image information in document 5 is divided into pixel data by line sensor 14, so that a picture of divided pixels or a digital latent image is formed on photosensitive body 23. Therefore, the quality of the image recorded on recording paper 16 is influenced by the resolution of line sensor 14 or the size of the pixels. Since the copied image provided by this facsimile device is a digital recorded image, as mentioned above, it is not good in quality compared to the copied image obtained by a regular electrophotography type reproduction machine.

SUMMARY OF THE INVENTION

This invention derives from the contemplation of such situation. It is an object of this invention to provide a facsimile apparatus which is capable of providing a copying image of high quality and reproducibility.

According to this invention, a facsimile apparatus for copying a document comprises an optical system comprising a light source for illuminating a document and optical system means for guiding the light from the light source reflected by the document; means for photoelectrically converting the light guided by the optical system system into an electrical image signal electrostatic recording; means including a photosensitive body for forming on a recording medium an image corresponding to the light entered into the photosensitive body; optical-path selective means for selectively imaging the light guided by the optical system means onto one of the photoelectric converting means and the photosensitive body; and control means for switching the optical-path selective means such that the light guided by optical system means is imaged onto the photosensitive body when the document is copied and that the light guided by the optical system means is imaged onto the photoelectric converting means when the document is transmitted.

According to such structure of this invention, the light guided by the optical system means and corresponding to the document image is directly imaged onto the photosensitive body and recorded.

Therefore, according to the facsimile apparatus of this invention, the same analog image as that obtained by electrophotography is obtained in copying. The facsimile apparatus according to this invention has a very simple structure which improves the quality of a copied image.

DESCRIPTION OF THE PREFERRED EMBODIMENT

Figure 1:
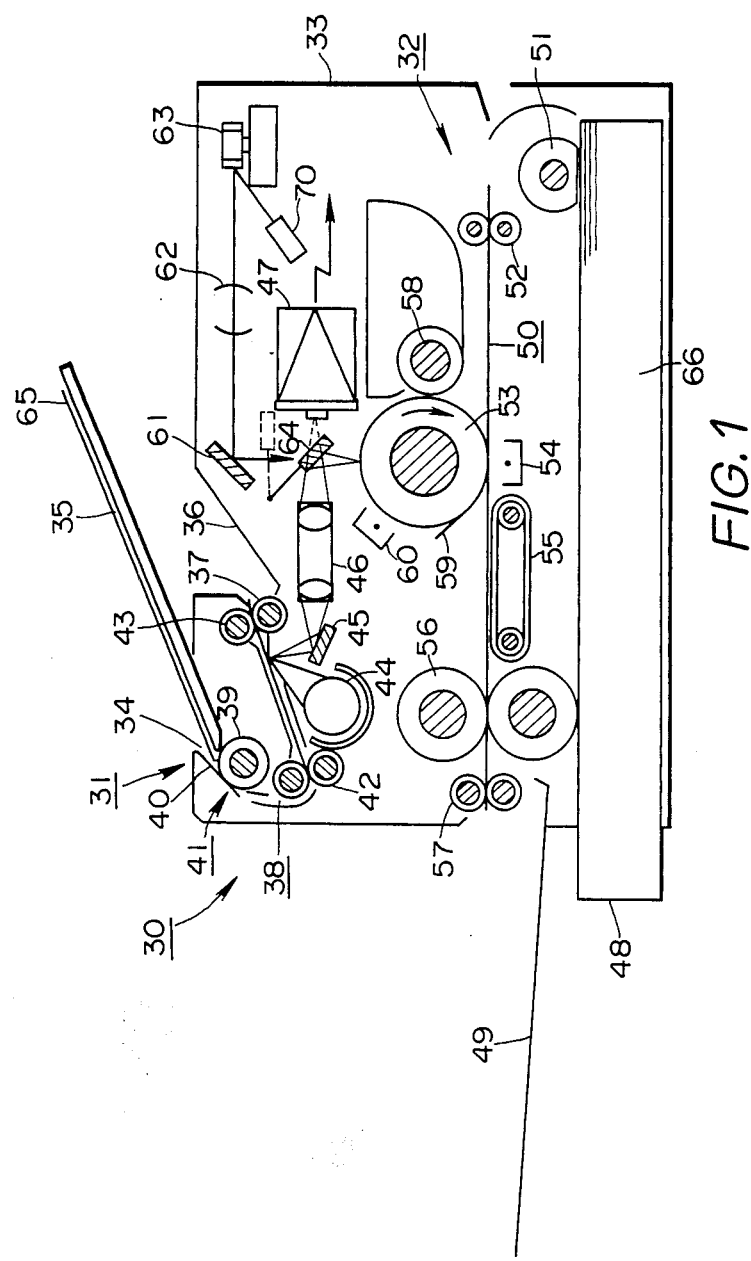
FIG. 1 schematically illustrates one embodiment of a facsimile apparatus according to this invention.

FIG. 1 illustrates a facsimile apparatus according to this invention.

The facsimile apparatus 30 includes transmitting unit 31 and receiving unit 32 and has a copying function.

Transmitting unit 31 has opening 34 at an upper left end of a housing 33, which opening 34 faces a lower end of paper feed table 35. Housing 33 has a slanted surface at its substantially upper center and used as paper discharge table 36. Opening 37 is formed at a lower end of paper discharge table 36. Document conveyor passageway 38 is formed between openings 37 and 34. Provided in passageway 38 are automatic paper feed means 41 including paper feed roller 39 and frictional separating plate 40 near opening 34, conveyor rollers 42 and discharge rollers 43. Fluorescent lamp 44 and fixed mirror 45 are installed down in the space between conveyor rollers 42 and discharge rollers 43 in document conveyoy passageway 38. A lens 46 and a line sensor 47 are disposed to the right of mirror 45. The line sensor 47 comprises photoelectric conversion elements arranged in a row.

On the other hand, at receiving unit 32, cassette 48 is disposed within a lower portion of casing 33, and paper discharge table 49 is disposed above the left end of cassette 48. Recording paper conveyor passageway 50 is formed extending from the right end of cassette 48 to paper discharge table 49. Paper feed roller 51 is disposed above the right end of cassette 48. Conveyor rollers 52, photosensitive body 53, transfer corotron 54, conveyor belt 55, fixing rollers 56 and discharge rollers 57 are disposed in this order in recording paper conveyor passageway 50. Disposed around photosensitive body 53 are developing unit 58, blade 59 which eliminates the remaining toner, and charging corotron 60. In order to introduce a laser beam corresponding to the received data onto photosensitive body 53, fixed mirror 61, lens 62, polygon mirror 63 and laser oscillator 70 are provided within the upper portion of casing 33.

In the particular facsimile apparatus, movable mirror 64 is disposed movable between lens 46 and line sensor 47. It is normally placed at the position shown by broken lines and moved to the position shown by solid lines in conjunction with pressing a copying button (not shown).

Figure 2:
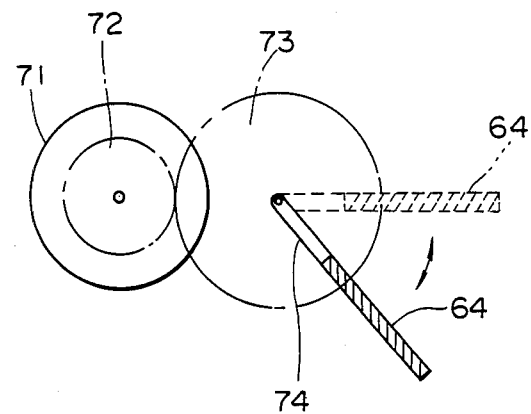
FIG. 2 illustrates one example of a mirror moving mechanism of the facsimile apparatus.
Figure 3:
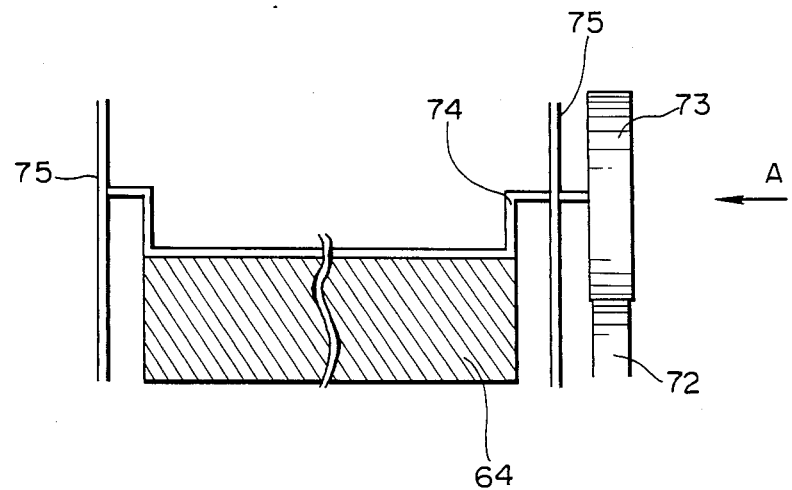
FIG. 3 is a front view of the mirror moving mechanism of FIG. 2.

FIGS. 2 and 3 show a specific structure for moving movable mirror 64 moved between two positions. FIG. 2 is a view obtained when the arrangement of FIG. 3 is viewed in the direction of arrow A.

Gear wheel 72 is attached to a rotational shaft of motor 71 and meshed with gear wheel 73 which is fixed to shaft 74 to which mirror 64 is, in turn, fixed. Shaft 74 is rotatably supported at each end by support 75. In such arrangement, when gear wheel 73 is rotated by motor 71, shaft 74 is rotated, so that movable mirror 64 can take the two positions shown by the solid and broken lines.

Figure 4:
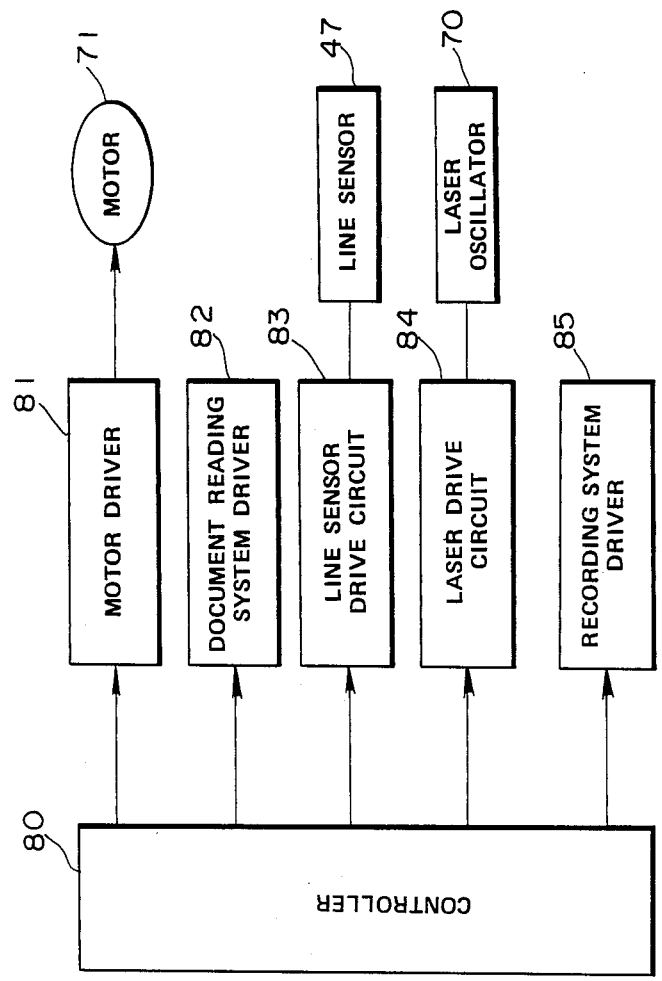
FIG. 4 is a block diagram showing an example of the structure of a control system used in the facsimile apparatus.

FIG. 4 shows an example of the structure of the control system. Controller 80 is connected to motor driver 81 which drives movable-mirror drive motor 71, document reading system driver 82 which drives a document conveyor system and light source 44, etc., line sensor drive circuit 83 which drives line sensor 47, laser drive circuit 84 which drives laser oscillator 70 and polygon mirror 63, and recording system driver 85 which drives photosensitive body 53, developing unit 58, and the recording paper conveyor system and controls these elements.

The specific operation of such arrangement will now be described by its respective transmitting, receiving and copying operations.

(TRANSMITTING OPERATION)

In transmission, documents 65 are placed on paper feed table 35 and a transmitting button (not shown) is pressed. By this operation, controller 80 starts up document reading system driver 82 and line sensor drive circuit 83. This causes automatic paper feed means 41 to feed documents 65 page by page into conveyor passageway 38. Documents 65 fed into passageway 38 are further conveyed by conveyor rollers 42, passed through the reader and discharged onto discharge paper table 36 by discharge rollers 43.

Document 65 is illuminated by fluorescent lamp 44 when it is passed through the reader. The reflected light from the document is entered via mirror 45 into lens 46. In this transmitting operation, movable mirror 64 stands at the position shown by the broken lines under control of controller 80. Therefore, the light having passed lens 46 is imaged onto line sensor 47 without being interrupted by movable mirror 64. The light is converted by line sensor 47 into an electrical signal which is then transmitted.

(RECEIVING OPERATION)

Also in the receiving operation, movable mirror 64 stands at the position shown by the broken line and does not interrupt the optical path extending from laser oscillator 70 to photosensitive body 53.

In reception, when the facsimile apparatus receives a signal transmitted by a distant facsimile apparatus, controller 80 starts up laser drive circuit 84 and recording system driver 85. This causes paper feed roller 51 to take sheets of recording paper 66 in cassette 48 sheet by sheet and feed it into conveyor passageway 50. The thus fed recording paper 66 is further conveyed by conveyor rollers 52 to reach photosensitive body 53. On the other hand, the received image information is converted to a laser beam by laser oscillator 70, imaged onto photosensitive body 53 via polygon mirror 63 and fixed mirror 61 to form an electrostatic latent image onto photosensitive body 53. This latent image is developed by developing unit 58 to thereby form a toner image thereon which is then transferred to the conveyed recording paper 66 by transfer corotron 54. Recording paper 66 onto which the toner image has been transferred is conveyed by conveyor belt 55 to fixing rollers 56 which then fix the toner image on the paper, and the recording paper is then discharged to paper discharge table 49 by fixing rollers 56 and discharging rollers 57.

(COPYING OPERATION)

In copying, document 65 is placed onto paper feed table 35 and a copying button (not shown) pressed. This causes controller 80 to start up motor driver 81 to thereby drive motor 71 so that movable mirror 61 is moved to the position shown by the solid lines. Simultaneously, controller 80 starts up document reading system driver 82 and recording system driver 85 so that document 65 is discharged onto discharge table 36 as in the transmitting operation. In the meantime, document 65 is illuminated by fluorescent lamp 44 at the reader. The light image reflected by document 65 is guided via fixed mirror 45 and lens 46 to movable mirror 64 which then alters the path of the light so as to form the document image on photosensitive body 53. On the other hand, recording paper 66 in cassette 48 is taken by paper feed roller 51 to reach photosensitive body 53 as in the receiving operation. The toner image on the photosensitive body is then transferred to the recording paper which is then discharged via fixing rollers 56 to paper discharge table 49.

As just described above, in the copying operation of the facsimile apparatus, the image data in document 65 read by the optical system is entered directly into photosensitive body 53 to thereby provide a copied image, so that the same copied image as that obtained by electrophotography is obtained.

While in the embodiment the path of the reflected light is altered toward photosensitive body 53 by movable mirror 64 provided in the optical reading path when the document is transmitted, the reflected light image may, in contrast, be imaged onto line sensor 47 via movable mirror 64 when the document is transmitted while the reflected light image may be imaged onto photosensitive body 53 when the document is copied, which is determined by the positional relationship between photosensitive body 53, line sensor 47, etc. Alternatively, movable mirror 64 may intervene in any of the above cases. In summary, it is only required for movable mirror 64 to be selectively moved such that the reflected light image is formed on one of line sensor 47 and photosensitive body 53.

While movable mirror 64 is moved by the arrangement of motor 71, gear wheels 72, 73, etc., in FIGS. 2 and 3, an arrangement for moving movable mirror 64 between the two positions is not limited to it. Any other arrangement such as a clutch system may be employed.

Figure 5:
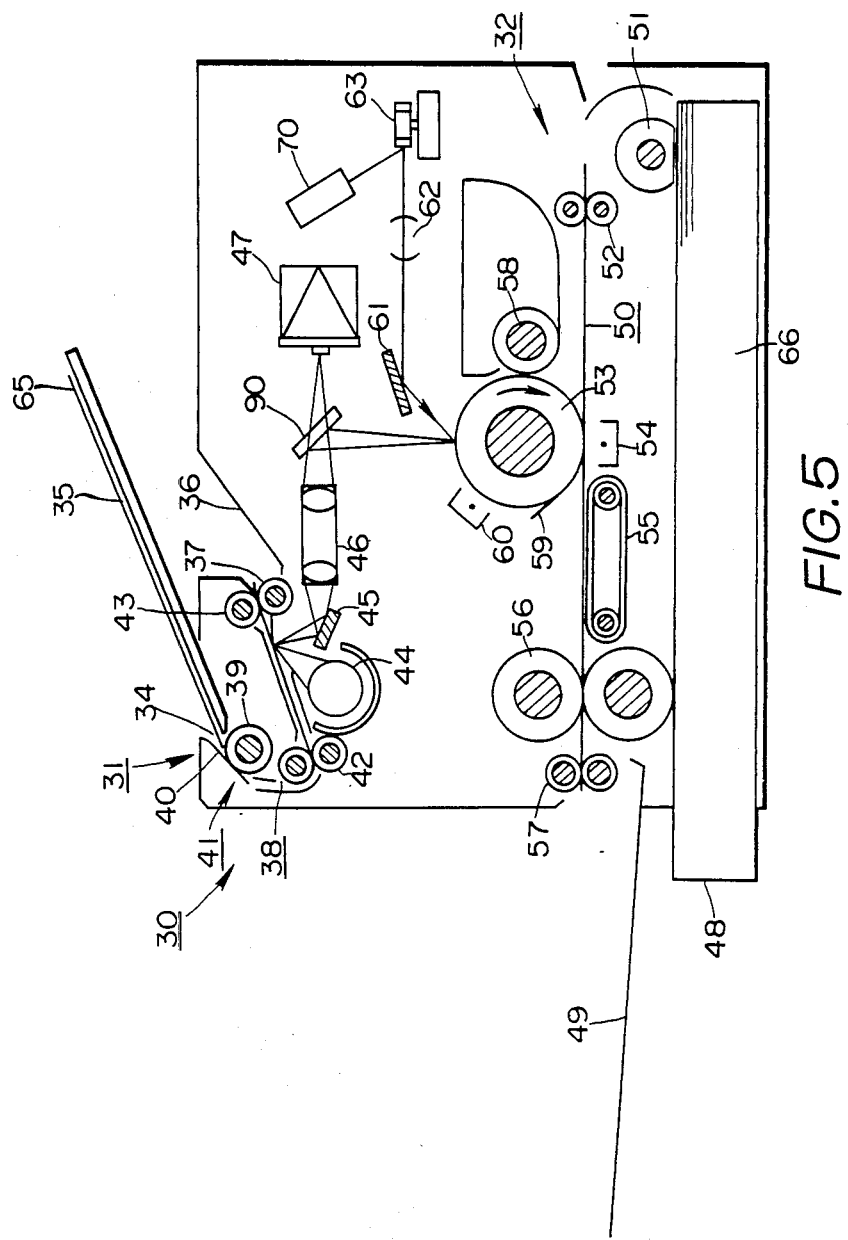
FIG. 5 schematically illustrates another embodiment of this invention.
Figure 6:
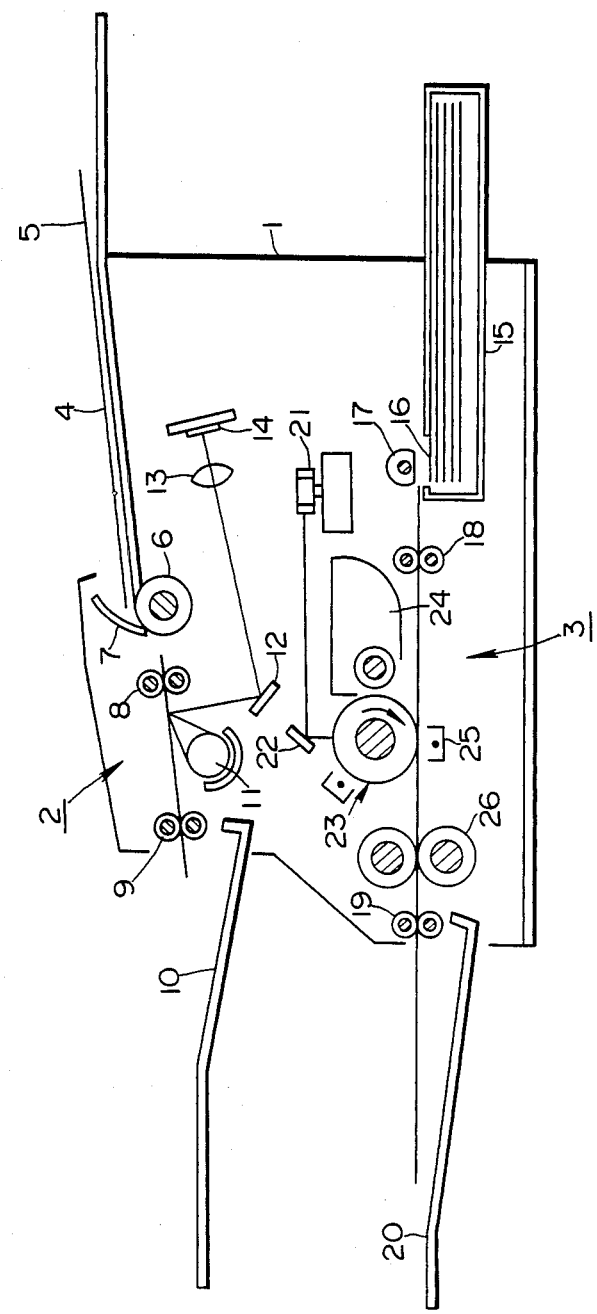
FIG. 6 illustrates one example of a conventional apparatus.

FIG. 5 shows another embodiment of this invention. In this embodiment, half mirror 90 is fixedly positioned instead of movable mirror 64 such that the laser path from the laser oscillator 70 to photosensitive body 53 is altered. Part of the reflected light from document 65 having passed lens 46 is entered into line sensor 47 by half mirror 90 and the remaining light is entered into photosensitive body 53.

(TRANSMITTING OPERATION)

In the arrangement of FIG. 5, when the transmission is to be performed, controller 80 starts up document reading system driver 82 and line sensor drive circuit 83. As a result, the light reflected by document 65 is entered by means of mirror 45, lens 46, and half mirror 90 to line sensor 47 where the light is converted to an electrical signal which is then transmitted. The light reflected by half mirror 90 is also entered into photosensitive body 53, in which case the laser drive circuit 84 and recording system driver 85 are not started up, so that recording is not performed.

(RECEIVING OPERATION)

In the receiving operation, controller 80 starts up laser drive circuit 84 and recording system driver 85 to thereby record received image information onto recording paper 66. In this receiving operation the document reading system driver 82 and line sensor drive circuit 83 are not started up, so that the light corresponding to the document image is not entered into photosensitive body 53.

(COPYING OPERATION)

In the copying operation, controller 80 starts up document reading system driver 82, laser drive circuit 84 and recording system driver 85. This causes the light from fluorescent lamp 44 reflected by document 65 to be entered by means of mirror 45 and lens 46 into half mirror 90. The light is then reflected by half mirror 90 and entered into photosensitive body 53. This causes a series of electrostatic recording processes comprising development, transfer, etc., to be performed, so that the read document image is copied onto recording paper 66. In this copying operation, the light having passed half mirror 90 is also entered into line sensor 47, which, however, does not perform photoelectric conversion because line sensor drive circuit 83 is turned off.

As just described above, in this embodiment, the document image read by fixed half mirror 90 is also entered directly into photosensitive body 53, so that electrostatically recorded high-quality image is obtained by electrophotography in copying.

The positional relationship of movable mirror 64 and half mirror 90 is not limited to the embodiment shown in FIGS. 1 and 5. Movable mirror 64 and half mirror 90 may be disposed at any position in the optical path extending from the document to line sensor 47.

What is claimed is:

1. A facsimile apparatus for copying a document comprising:
    an optical system comprising a light source for illuminating a document and optical system light-guiding means for guiding the light from the light source reflected by the document;
    means for photoelectrically converting the light guided by the optical system into an electrical image signal;
    electrostatic recording means including a photosensitive body for forming on a recording medium an image corresponding to the light entered onto the photosensitive body;
    optical-path selective means for selectively imaging the light guided by the optical system light-guiding means onto one of the photoelectric conversion means and the photosensitive body, the optical-path selective means including a mirror and means for moving the mirror between a first position where the light guided by the optical system means is reflected to alter the path of the light and a second position where the light is not reflected; and
    control means for switching the optical-path selective means such that the light guided by the optical system light-guiding means is imaged onto the photosensitive body when the document is copied and the light guided by the optical system light-guiding means is imaged onto the photoelectric conversion means when the document is transmitted.

2. A facsimile apparatus according to claim 1, wherein the mirror images the light onto the photosensitive body when the mirror takes the first position, and onto the photoelectric conversion means when the mirror takes the second position, and wherein the control means switches the mirror such that the mirror takes the first position when the document is copied and the second position when the document is transmitted.

3. A facsimile apparatus according to claim 1, wherein the mirror images the light onto the photoelectric conversion means when the mirror takes the first position and onto the photosensitive body when the mirror takes the second position, and wherein the control means switches the mirror such that the mirror takes the second position when the document is copied and the first position when the document is transmitted.

4. A facsimile apparatus according to claim 1, wherein the mirror refracts incident light thereon at an angle of 90 degrees when the mirror takes the first position.

5. A facsimile apparatus according to claim 1, wherein the mirror moving means includes a rotational shaft, a support for supporting the mirror rotatably, and a motor coupled by a gear wheel to the rotational shaft.

6. A facsimile apparatus for copying a document comprising:
    an optical system comprising a light source for illuminating a document and optical system light-guiding means for guiding the light from the light source reflected by the document;

means for photoelectrically converting the light guided by the optical system into an electrical image signal;

electrostatic recording means including a photosensitive body for forming on a recording medium an image corresponding to the light entered onto the photosensitive body;

optical-path selective means for selectively imaging the light guided by the optical system light-guiding means onto one of the photoelectric conversion means and the photosensitive body;

control means for switching the optical-path selective means such that the light guided by the optical system light-guiding means is imaged onto the photosensitive body when the document is copied and that the light guided by the optical system light-guiding means is imaged onto the photoelectric conversion means when the document is transmitted.

7. A facsimile apparatus according to claim 6, wherein the light source and the optical system light-guiding means are fixedly disposed and scan an image on a moving document.

8. A facsimile apparatus according to claim 6 wherein the photoelectric conversion means includes a line sensor comprising a plurality of photoelectric conversion elements arranged in a row.

9. A facsimile apparatus according to claim 6, wherein the electrostatic recording means includes:

laser optical system means for converting the electrical image signal to an optical signal and for introducing the optical signal onto the photosensitive body;

developing means for developing the image corresponding to the light entered onto the photosensitive body to form a toner image;

transfer means for transferring the toner image to the recording medium;

fixing means for fixing the toner image transferred to the recording medium; and conveying means for conveying the recording means between the transfer means and the photosensitive body.

10. A facsimile apparatus according to claim 9 wherein the laser optical system means includes:

a laser oscillator for converting the electrical image signal to an optical signal, said laser oscillator having a laser beam output; and optical means for guiding the laser beam output from the laser oscillator onto the photosensitive body.

11. A facsimile apparatus according to claim 10, wherein the optical-path selective means includes a mirror and means for moving the mirror between a first position where the light guided by the optical system light-guiding means is reflected onto the photosensitive body and a second position where the guided light is not reflected and where the laser beam output guided by the optical means of the laser optical system means is guided onto the photosensitive body without being reflected, the control means switching the mirror such that the mirror takes the first position when the document is copied and the mirror takes the second position when the document is transmitted and received.

12. A facsimile apparatus for copying a document, comprising:

an optical system comprising a light source for illuminating a document and light-guiding means for guiding the light from the light source reflected by the document;

means for photoelectrically converting the light guided by the optical system into an electrical image signal;

electrostatic recording means including a photosensitive body for forming on a recording medium an image corresponding to the light entered onto the photosensitive body;

optical-path dividing means for dividing the light guided by the optical system light-guiding means and imaging the divided light portions onto both the photoelectric conversion means and the photosensitive body; and control means for selectively performing a driving function such that the electrostatic recording means is driven when the document is copied and the photoelectric conversion means is driven when the document is transmitted.

13. A facsimile apparatus according to claim 10 wherein the optical-path dividing means includes a half mirror for transmitting part of the incident light thereon and reflecting the remainder of the incident light so as to alter the optical path of the incident light.

14. A facsimile apparatus according to claim 11 wherein the half mirror is disposed so as to refract the incident light thereon at an angle of 90 degrees.

* * * * *